(12) United States Patent
Masih

(10) Patent No.: US 8,468,456 B2
(45) Date of Patent: Jun. 18, 2013

(54) DIRECTORY DEVICE IMPLEMENTABLE ELECTRONIC TELEPHONE DIRECTORY

(75) Inventor: Meena Michelle Masih, Duluth, GA (US)

(73) Assignee: AT&T Intellectual Property, I, L.P., Atlanta, GA (US)

(*) Notice: Subject to any disclaimer, the term of this patent is extended or adjusted under 35 U.S.C. 154(b) by 586 days.

(21) Appl. No.: 12/648,998

(22) Filed: Dec. 29, 2009

(65) Prior Publication Data

US 2010/0104084 A1    Apr. 29, 2010

Related U.S. Application Data

(63) Continuation of application No. 10/237,497, filed on Sep. 9, 2002, now Pat. No. 7,665,023.

(51) Int. Cl.
*H04M 3/42* (2006.01)

(52) U.S. Cl.
USPC .......................................................... 715/739

(58) Field of Classification Search
USPC .......................................................... 715/739
See application file for complete search history.

(56) References Cited

U.S. PATENT DOCUMENTS

| | | | |
|---|---|---|---|
| 5,105,197 A * | 4/1992 | Clagett | 342/419 |
| 5,483,586 A * | 1/1996 | Sussman | 379/218.01 |
| 5,650,994 A | 7/1997 | Daley | |
| 5,748,493 A * | 5/1998 | Lightfoot et al. | 709/227 |
| 5,748,906 A | 5/1998 | Sandig | |
| 5,796,727 A * | 8/1998 | Harrison et al. | 370/338 |
| 6,144,380 A | 11/2000 | Shwarts et al. | |
| 6,173,045 B1 * | 1/2001 | Smith | 379/93.23 |
| 6,229,502 B1 | 5/2001 | Schwab | |
| 6,243,071 B1 | 6/2001 | Shwarts et al. | |
| 6,389,278 B1 * | 5/2002 | Singh | 455/414.3 |
| 6,484,177 B1 * | 11/2002 | Van Huben et al. | 1/1 |
| 6,557,756 B1 * | 5/2003 | Smith | 235/379 |
| 6,687,362 B1 | 2/2004 | Lindquist et al. | |
| 6,738,815 B1 | 5/2004 | Willis et al. | |
| 6,870,921 B1 | 3/2005 | Elsey et al. | |
| 7,665,023 B1 | 2/2010 | Masih | |
| 2002/0082001 A1 * | 6/2002 | Tanaka et al. | 455/414 |
| 2003/0191750 A1 * | 10/2003 | Espino | 707/3 |
| 2007/0067314 A1 * | 3/2007 | Colwill, Jr. | 707/10 |
| 2008/0195487 A1 * | 8/2008 | Amengual et al. | 705/14 |

* cited by examiner

*Primary Examiner* — Omar Abdul-Ali
*Assistant Examiner* — Haimei Jiang
(74) *Attorney, Agent, or Firm* — Woodcock Washburn LLP

(57) ABSTRACT

A system for providing directory information is disclosed. The system includes a computer and a directory device connected to the computer. The directory device includes a memory storage device for storing directory information and telecommunications information obtained from the computer. The telecommunications services information includes information on establishing telephone service.

21 Claims, 4 Drawing Sheets

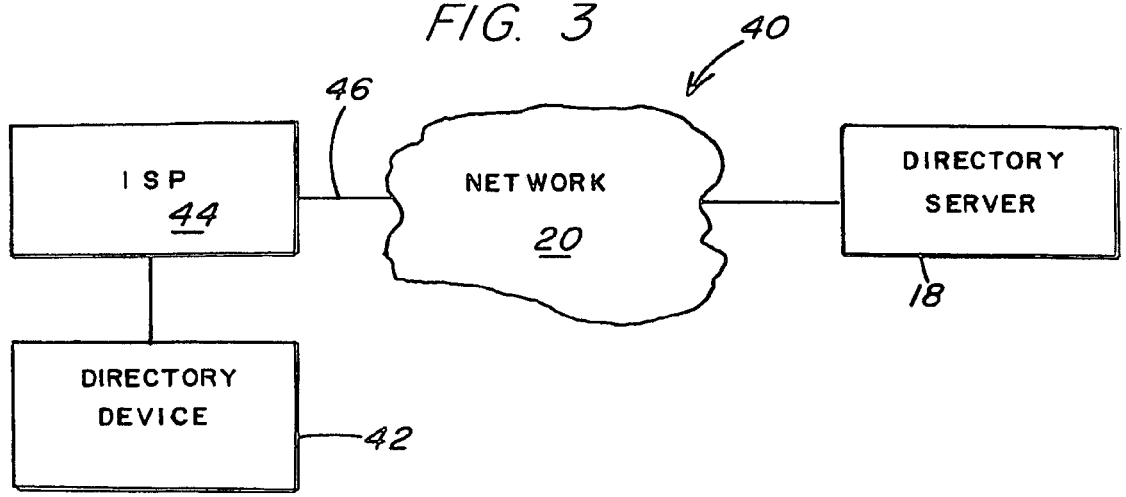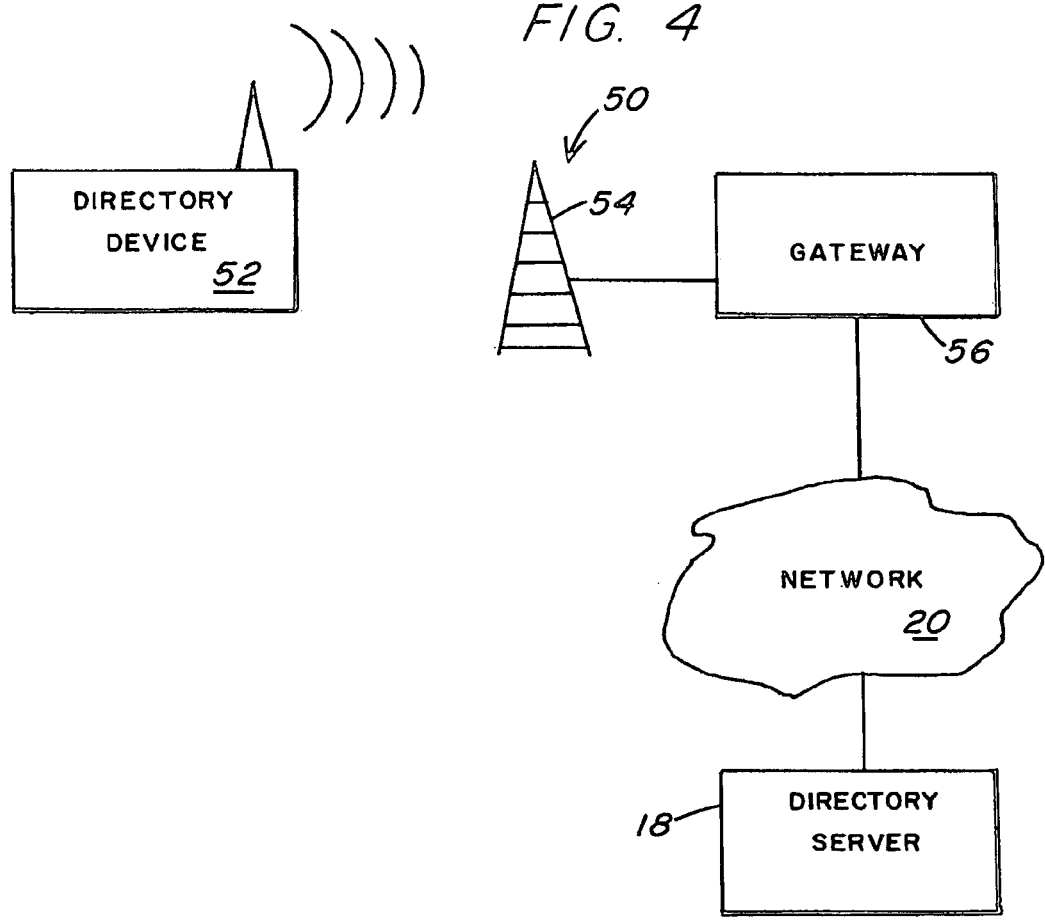

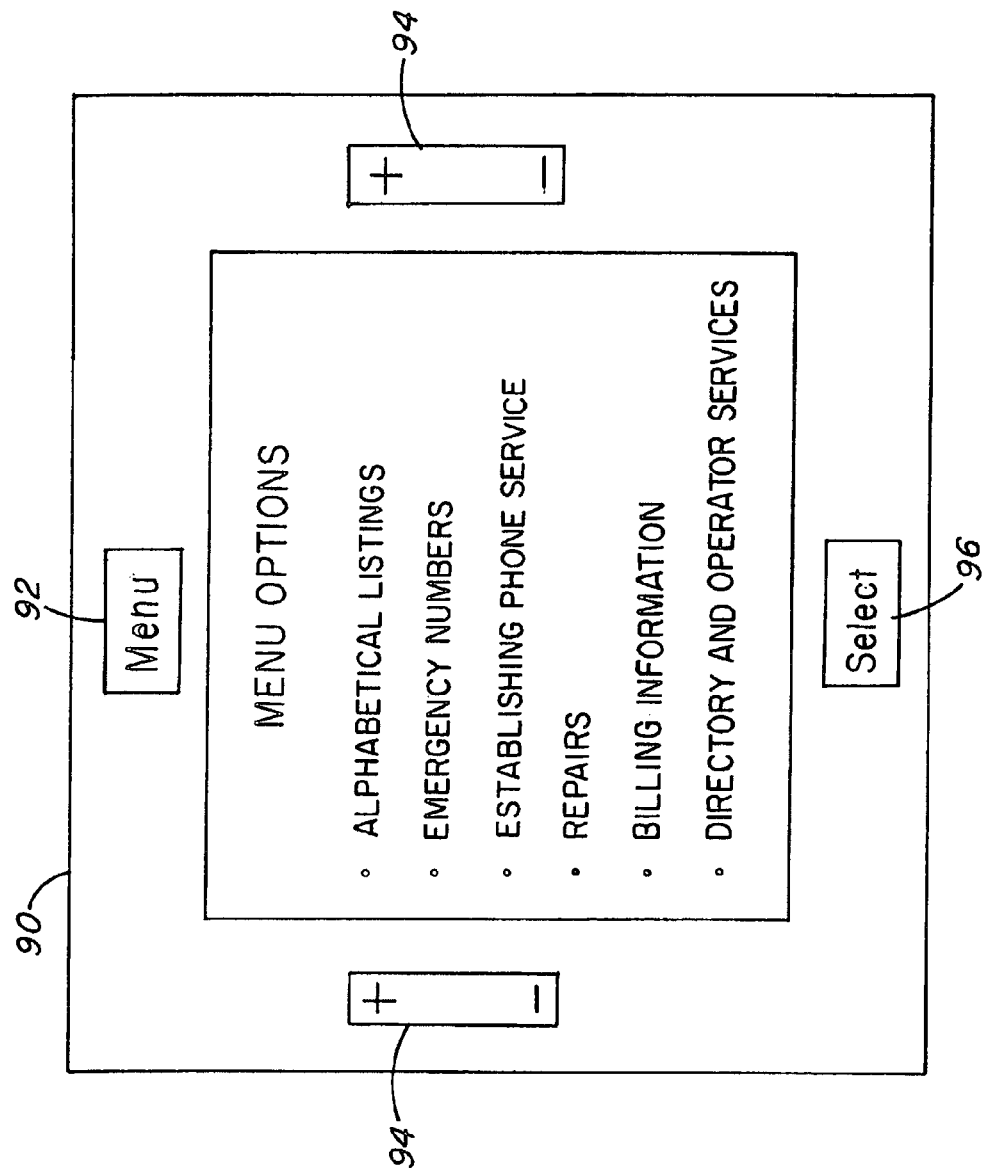

DIRECTORY DEVICE IMPLEMENTABLE ELECTRONIC TELEPHONE DIRECTORY

The present application is a continuation of U.S. application Ser. No. 10/237,497, filed Sep. 9, 2002, the contents of which are incorporated herein by reference in their entirety.

BACKGROUND

The present invention is directed generally and in various embodiments to electronic telephone directories.

Telecommunications companies and telephone directory companies typically print and distribute a paper telephone directory that may include "white page" and/or "yellow page" listings. The cost of printing and distributing such directories may be very high, especially in densely populated areas where the directories must include more listings and must be distributed to more houses and businesses. Also, because paper directories are typically printed once a year, it is difficult to update a listing in a directory or to correct errors in listings in a directory.

SUMMARY

In one embodiment, the present invention is directed to a system including a computer and a directory device in communication with the computer, the directory device including a memory storage device for storing directory information, wherein the directory information is obtained from the computer.

In one embodiment, the present invention is directed to a system including a directory server and a directory device in communication with the directory server, the directory device including a memory storage device for storing directory information, wherein the directory device obtains the directory information from the directory server.

In one embodiment, the present invention is directed to a directory device. The device includes a processor and a memory device in communication with the processor, the memory device for storing directory information. The device also includes a modem in communication with the processor, the modem for interfacing with a network to obtain the directory information.

In one embodiment, the present invention is directed to a method of storing directory information in a directory device. The method includes receiving, by a computer, the directory information and transferring the directory information from the computer to the directory device. The method also includes storing the directory information in a memory device located in the directory device.

In one embodiment, the present invention is directed to a system. The system includes means for receiving directory information and means for transferring the directory information from the means for receiving the directory information to a directory device. The system also includes means for storing the directory information in the directory device.

BRIEF DESCRIPTION OF THE DRAWINGS

Further advantages of the present invention may be better understood by referring to the following description taken in conjunction with the accompanying drawings, in which:

FIG. 3 is a diagram illustrating an embodiment of a system that includes a directory device;

FIG. 4 is a diagram illustrating an embodiment of a system that includes a directory device;

FIG. 7 is a diagram illustrating a sample screen of a directory device in operation.

DETAILED DESCRIPTION OF ILLUSTRATIVE EMBODIMENTS

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

The present invention, in various embodiments, relates to electronic telephone directories. In various embodiments, the content of an electronic directory is updated via a computer that is in communication with the directory. In various embodiments, the content of the electronic directory is updated via a network such as, for example, the Internet.

Figure 1:
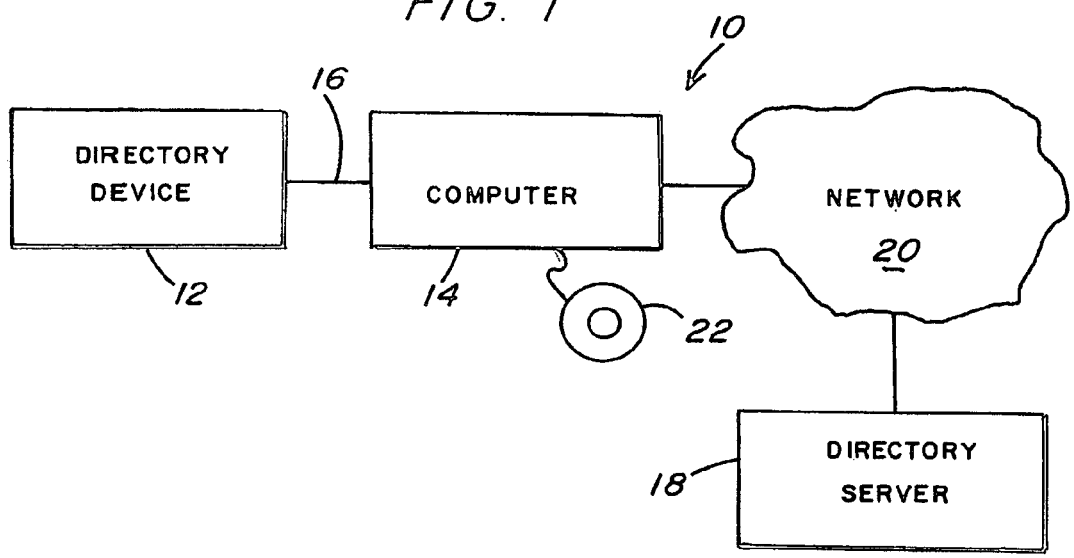
FIG. 1 is a diagram illustrating an embodiment of a system that includes a directory device.

FIG. 1 is a diagram illustrating an embodiment of a system 10 that includes a directory device 12. The directory device 12 is in communication with a computer 14 via, for example, a cable 16. The computer 14 may be, for example, a personal computer, a personal digital assistant, or an Internet appliance. The computer 14 is in communication with a directory server 18 via a network 20. The network 20 may be, for example, a local area network (LAN), a wide area network (WAN), an intranet, or the Internet.

The directory server 18 may be, for example, a web server that is capable of serving content to the computer 14. Such content could include, for example, telephone "white page" and "yellow page" listings in, for example, a text format or a digital multimedia format.

It can be understood that certain elements of the system 10 have been omitted or simplified. For example, in the case where the network 20 is the Internet, an Internet service provider (ISP) would be located between the computer 14 and the network 20.

In operation, a user is given or purchases the directory device 12. The device 12 may have directory information already stored therein or may have no information stored therein. In the latter case or in the case where directory information stored in the device 12 is to be updated, the user of the device 12 instructs the computer 14 to obtain directory information from the directory server 18. The user may then connect the device 12 to the computer 14 via the cable 16 and instruct the computer 14 to transfer the directory information to the device 12.

In one embodiment, the directory information is stored on a storage medium 22. The medium 22 may be, for example, a magnetic storage medium such as a floppy disk or an optical storage medium such as a compact disc. The directory information may be, for example, pre-stored on the medium 22 or may be obtained by the computer 14 from the directory server 18 as discussed above. The storage medium 22 is read by the computer 14 to retrieve the directory information and the information is transferred to the device 12 via the cable 16.

In one embodiment, the directory information is obtained by the computer 14 from the directory server 18 and is transferred to the medium 22. The medium 22 is then read directly by the device 12 via a device such as, for example, a disk drive or a compact disc reader (not shown).

Figure 2:
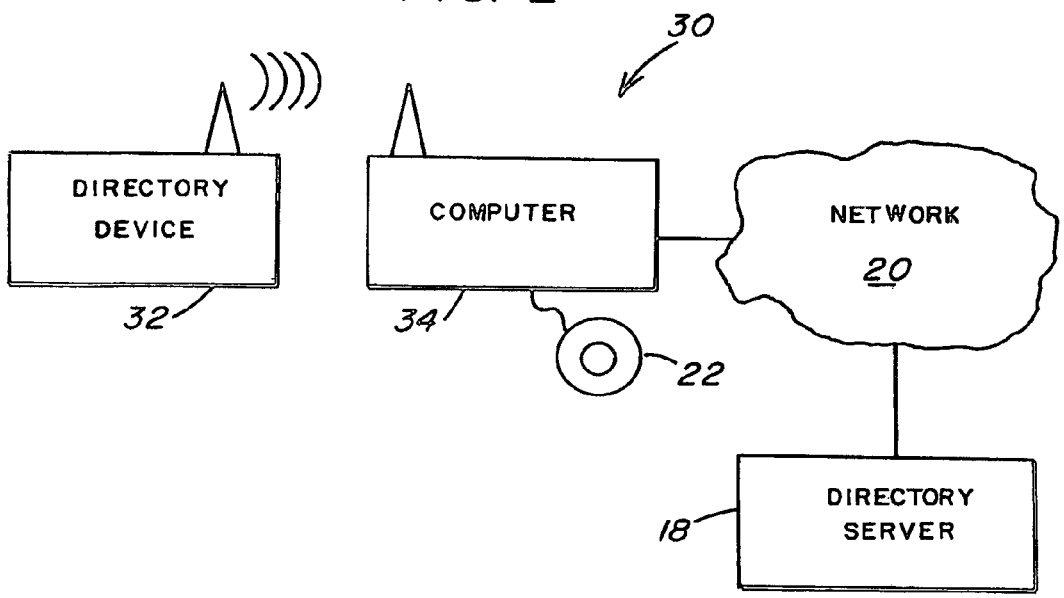
FIG. 2 is a diagram illustrating an embodiment of a system that includes a directory device.

FIG. 2 is a diagram illustrating an embodiment of a system 30 that includes a directory device 32. In the embodiment illustrated in FIG. 2, the device 32 is in communication with a computer 34 via a wireless link. The computer 34 may be, for example, a personal computer, a personal digital assistant, or an Internet appliance that has wireless communications capability. The device 32 and the computer 34 may communicate using, for example, radio frequency (RF) communication means.

In operation, a user is given or purchases the directory device 32. The device 32 may have directory information already stored therein or may have no information stored therein. In the latter case or in the case where directory information stored in the device 32 is to be updated, the user of the device 32 instructs the computer 34 to obtain directory information from the directory server 18. The user may then instruct the computer 34 to transfer the directory information to the device 32 via a wireless communication link.

In one embodiment, the directory information is stored on a storage medium 22. The medium 22 may be, for example, a magnetic storage medium such as a floppy disk or an optical storage medium such as a compact disc. The directory information may be, for example, pre-stored on the medium 22 or may be obtained by the computer 34 from the directory server 18 as discussed above. The storage medium 22 is read by the computer 34 to retrieve the directory information and the information is transferred to the device 32 via a wireless communication link.

FIG. 3 is a diagram illustrating an embodiment of a system 40 that includes a directory device 42. In the embodiment illustrated in FIG. 3, the device 42 has the capability to access the network 20 via, for example, an Internet service provider (ISP) 44 that is in communication with the network 20.

In operation, a user is given or purchases the directory device 42. The device 42 may have directory information already stored therein or may have no information stored therein. In the latter case or in the case where directory information stored in the device 42 is to be updated, the user of the device 42 connects the device 42 to, for example, a telephone line 46 and the user dials an access telephone number to connect to the network 20 via the ISP 44. The user then instructs the device 42 to obtain directory information from the directory server 18 by entering, for example, a URL address of a page of information that is stored on the server 18.

FIG. 4 is a diagram illustrating an embodiment of a system 50 that includes a directory device 52. The device 52 is in communication with a wireless network 54. The wireless network 54 maybe, for example, a cellular telephone network. The network 54 is in communication with the network 20 via a wireless gateway 56.

In operation, a user is given or purchases the directory device 52. The device 52 may have directory information already stored therein or may have no information stored therein. In the latter case or in the case where directory information stored in the device 52 is to be updated, the user of the device 52 establishes a connection with the directory server 18 by, for example, dialing an access telephone number to access the network 20 via the gateway 56. The user then instructs the device 52 to obtain directory information from the directory server 18 by entering, for example, a URL address of a page of information that is stored on the server 18.

Figure 5:
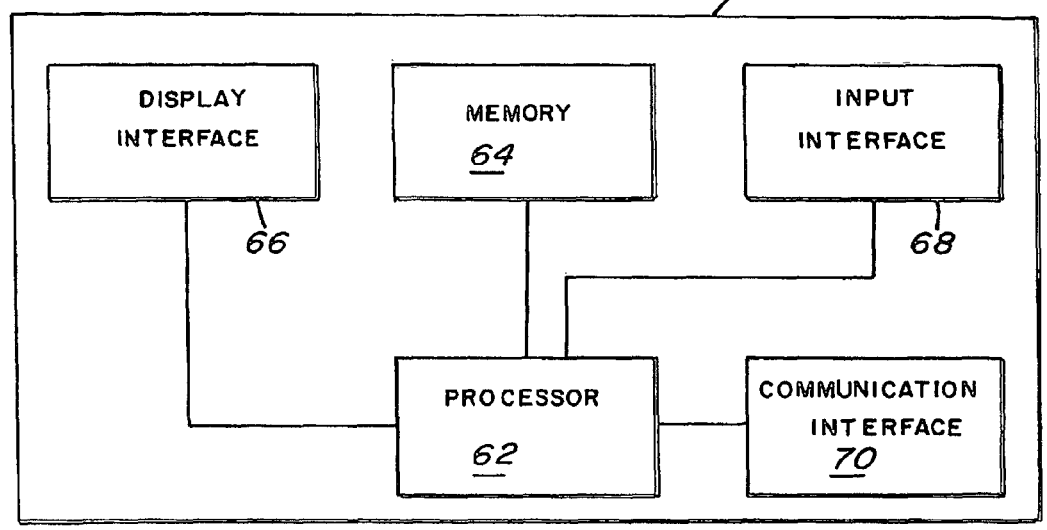
FIG. 5 is a diagram illustrating an embodiment of a directory device.

FIG. 5 is a diagram illustrating an embodiment of a directory device 60. The device 60 may be used in, for example, the systems 10 and 30 of FIGS. 1 and 2, respectively. The device 60 may be an embodiment of the devices 12 and 32 of FIGS. 1 and 2, respectively. The device 60 includes a processor 62. The processor 62 may be, for example, a microprocessor. The device also includes a memory device 64. The memory device 64 may be, for example, a random access memory (RAM) that may store, for example, telephone directory information.

A display interface 66 is in communication with the processor 62. The display interface 66 may cause information to be displayed on a display device (not shown) such as, for example, a liquid crystal display (LCD). An input interface 68 is in communication with the processor 62 and can interface, for example, with an input device (not shown) such as, for example, a keyboard, a keypad, a pointing device, or individual keys or buttons.

A communication interface 70 is in communication with the processor 62. The communication interface 70 may be, for example, a wireline or wireless interface unit that enables the device 60 to communicate with the computers 14 and 34 of FIGS. 1 and 2, respectively.

Figure 6:
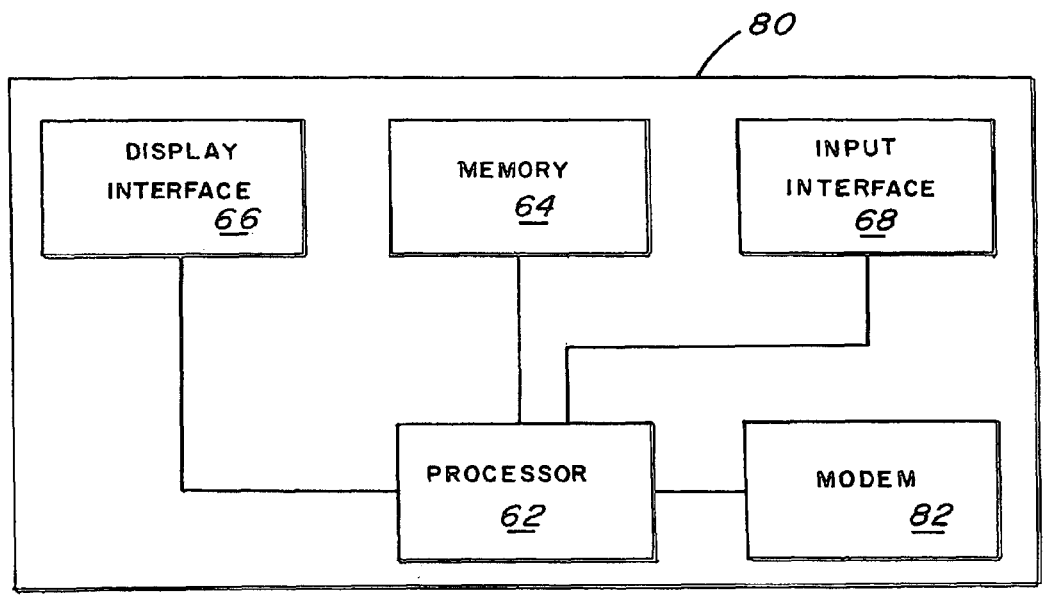
FIG. 6 is a diagram illustrating an embodiment of a directory device.

FIG. 6 is a diagram illustrating an embodiment of a directory device 80. The device 80 may be used in, for example, the systems 40 and 50 of FIGS. 3 and 4, respectively. The device 80 may be an embodiment of the devices 42 and 52 of FIGS. 3 and 4, respectively. The device 80 includes the processor 62, the memory device 64, the display interface 66, the input interface 68, and a modem 82. The modem 82 may be used to communicate with the ISP 44 or the wireless network 54 of FIGS. 3 and 4, respectively.

Although the various components of the devices 60 and 80 are illustrated in FIGS. 5 and 6 as being individually connected to the processor 62, it can be understood that the various components may be in communication with the processor 62 and with each other via a bus architecture.

FIG. 7 is a diagram illustrating a sample screen 90 of a directory device in operation. The screen 90 may be displayed on the devices 12, 32, 42, and 52 of FIGS. 1-4, respectively. The screen 90 depicts a menu screen that may be used to select various options relating to the device. The menu screen may be selected by the user of the device depressing a menu button 92. The user may scroll through various options on various screens, including the menu screen depicted in FIG. 7, using scroll buttons 94. Likewise, the user can select various items on the screen 90 using a select button 96.

In addition to alphabetical listings and emergency contact numbers, the directory device of the present invention, in various embodiments, may contain information relating to telecommunications services such as, for example, information on how to establish telephone service, repair information, billing information, and directory and operator services information. The device may also include the ability to search the directory information by, for example, keyword. Such keyword could be entered via, for example, a keypad or a keyboard.

In one embodiment of the present invention, the directory information is compressed before being transferred to the directory device. In such a case, the device decompresses the information either upon receipt of the information or on an as-needed basis when information is requested by the user of the device.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method comprising:
   receiving, from a directory device, a URL address entered, via the directory device, as an instruction to obtain directory information from a directory server, wherein the directory device comprises a processor, a display interface, an input device, search functionality for searching information on the directory device via a keyword, and a memory storage device for storing directory information and telecommunications services information obtained from the directory server, the telecommunications services information comprising information for establishing telephone service, billing information, repair information, and operator services information;
   displaying, via the display interface, a menu with selectable options for selecting the telecommunications services information, wherein the telecommunications services information includes information for establishing telephone service, billing information, repair information, and operator services information;
   dialing an access number to access a network via a gateway;
   establishing a connection with the directory server; and
   receiving, over the network, the directory information and telecommunications services information.

2. The method of claim 1, further comprising searching information via a keyword.

3. The method of claim 1, further comprising storing the received directory information and the telecommunications services information received.

4. The method of claim 1, wherein the network includes at least one of a local area network, a wide area network, an intranet, or an internet.

5. The method of claim 1, wherein the directory server includes a web server.

6. The method of claim 1, further comprising transmitting instructions corresponding to the URL address entered from the directory device to a local device, wherein the local device dials the access number, establishes the connection, and receives the directory information and telecommunications services.

7. The method of claim 6, wherein the local device is a computer configured to retrieve and transfer directory information from at least one of a storage medium or from the directory server via the network.

8. The method of claim 6, wherein the local device stores compressed telecommunications services information.

9. The method of claim 8, wherein the directory device receives the compressed telecommunications services information from the local device and selectively decompresses the telecommunications services information.

10. The method of claim 1, further comprising receiving directory information and telecommunications information from a storage medium wherein the directory information and the telecommunications information is pre-stored in the storage medium.

11. The method of claim 10, wherein the information received over the network updates the information pre-stored in the storage medium.

12. The method of claim 1, wherein the URL address is a URL address of a page of information stored on the directory server.

13. The method of claim 1, wherein the network is a wireless network in communication with a wireless gateway.

14. A directory device comprising:
   a processor; and
   memory coupled to the processor, the memory having executable instructions stored thereon that when executed by the processor cause the processor to effectuate operations comprising:
      receiving a URL address entered, via the directory device, as an instruction to obtain directory information from a directory server, wherein the directory device comprises a processor, a display interface, an input device, search functionality for searching information on the directory device via a keyword, and a memory storage device for storing directory information and telecommunications services information obtained from the directory server, the telecommunications services information comprising information for establishing telephone service, billing information, repair information, and operator services information;
      displaying, via the display interface, a menu with selectable options for selecting the telecommunications services information, wherein the telecommunications services information includes information for establishing telephone service, billing information, repair information, and operator services information;
      dialing an access number to access a network via a gateway;
      establishing a connection with the directory server; and
      receiving, over the network, directory information and telecommunications service information stored in the directory server.

15. The directory device of claim 14, the operations further comprising transmitting instructions corresponding to the URL address entered from the directory device to a local device, wherein the local device dials the access number, establishes the connection, and receives the directory information and telecommunications services.

16. The directory device of claim 15, wherein the local device is a computer configured to retrieve and transfer directory information from at least one of a storage medium or from the directory server via the network.

17. The directory device of claim 15, the operations further comprising receiving compressed telecommunications services information from the local device and selectively decompresses the telecommunications services information.

18. The directory device of claim 14, wherein the information received over the network updates information pre-stored in the memory.

19. The directory device of claim 14, wherein the URL address is a URL address of a page of information stored on the directory server.

20. The directory device of claim 14, wherein the network is a wireless network in communication with a wireless gateway.

21. A tangible computer readable storage medium comprising executable instructions that when executed by a processor cause the processor to effectuate operations comprising:
   receiving, from a directory device, a URL address entered, via the directory device, as an instruction to obtain directory information from a directory server, wherein the directory device comprises a processor, a display interface, an input device, search functionality for searching information on the directory device via a keyword, and a memory storage device for storing directory information and telecommunications services information obtained from the directory server, the telecommunications services information comprising information for establishing telephone service, billing information, repair information, and operator services information;

displaying, via the display interface, a menu with selectable options for selecting the telecommunications services information, wherein the telecommunications services information includes information for establishing telephone service, billing information, repair information, and operator services information;

dialing an access number to access a network via a gateway;

establishing a connection with the directory server; and receiving, over the network, the directory information and telecommunications services information.

* * * * *